US011028250B2

(12) United States Patent
Zhang et al.

(10) Patent No.: US 11,028,250 B2
(45) Date of Patent: Jun. 8, 2021

(54) COMPOSITION WITH THERMAL CONDUCTIVITY AND LASER PLATING PERFORMANCE BY CORE-SHELL STRUCTURE LDS ADDITIVE WITH METAL COMPOUNDS COATED ON MINERAL FILLER SURFACE

(71) Applicant: SHPP Global Technologies B.V., Bergen op Zoom (NL)

(72) Inventors: Yaqin Zhang, Shanghai (CN); Jian Wang, Shanghai (CN); Mingcheng Guo, Shanghai (CN); Yunan Cheng, Shanghai (CN); Shijie Song, Shanghai (CN)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 16/477,036

(22) PCT Filed: Jan. 11, 2018

(86) PCT No.: PCT/IB2018/050188
§ 371 (c)(1),
(2) Date: Jul. 10, 2019

(87) PCT Pub. No.: WO2018/130972
PCT Pub. Date: Jul. 19, 2018

(65) Prior Publication Data
US 2020/0262998 A1 Aug. 20, 2020

Related U.S. Application Data

(60) Provisional application No. 62/444,922, filed on Jan. 11, 2017.

(51) Int. Cl.
| C08K 3/04 | (2006.01) |
| C08K 3/22 | (2006.01) |
| C08K 3/34 | (2006.01) |
| C08K 3/38 | (2006.01) |
| C08K 7/14 | (2006.01) |
| C23C 18/16 | (2006.01) |
| C08L 23/06 | (2006.01) |
| C08L 27/18 | (2006.01) |
| C08L 69/00 | (2006.01) |

(52) U.S. Cl.
CPC .............. *C08K 3/04* (2013.01); *C08K 3/2279* (2013.01); *C08K 3/346* (2013.01); *C08K 3/38* (2013.01); *C08K 7/14* (2013.01); *C23C 18/1641* (2013.01); *C08K 2003/2241* (2013.01); *C08K 2003/385* (2013.01); *C08K 2201/001* (2013.01); *C08K 2201/005* (2013.01); *C08L 23/06* (2013.01); *C08L 27/18* (2013.01); *C08L 69/005* (2013.01); *C08L 2203/20* (2013.01)

(58) Field of Classification Search
CPC ... C08K 3/04; C08K 7/14; C08K 3/38; C08K 3/2279; C08K 3/346; C08K 2201/001; C08K 2201/005; C08K 2003/385; C08K 2003/2241; C08L 27/18; C23C 18/1641
USPC .......................................................... 524/404
See application file for complete search history.

(56) References Cited

U.S. PATENT DOCUMENTS

| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,512,606 A | 6/1950 | Bolton et al. |
| 4,970,272 A | 11/1990 | Gallucci |
| 5,489,639 A | 2/1996 | Faber et al. |
| 5,630,979 A | 5/1997 | Welz et al. |
| 5,928,780 A | 7/1999 | Schmidt et al. |
| 6,214,917 B1 | 4/2001 | Linzmeier et al. |
| 6,521,688 B1 | 2/2003 | Linzmeier et al. |
| 7,713,607 B2 | 5/2010 | Sugawara et al. |

(Continued)

FOREIGN PATENT DOCUMENTS

| CN | 102796372 A | 11/2012 |
| KR | 2015-0073093 A | 6/2015 |
| KR | 2016-0016957 A | 2/2016 |
| WO | WO 2003/080285 A1 | 10/2003 |
| WO | WO 2012/126831 A1 | 9/2012 |
| WO | WO 2013/012685 A2 | 1/2013 |
| WO | WO 2014/096153 A1 | 6/2014 |
| WO | WO 2014/115092 A1 | 7/2014 |
| WO | WO 2015/130676 A1 | 9/2015 |
| WO | WO 2016/132336 A1 | 8/2016 |

OTHER PUBLICATIONS

International Patent Application No. PCT/IB2018/050188; Int'l Written Opinion and Search Report; dated Apr. 30, 2018; 9 pages.

(Continued)

*Primary Examiner* — Hui H Chin
(74) *Attorney, Agent, or Firm* — Quicker Law, LLC

(57) ABSTRACT

The disclosure concerns thermally conductive polymer compositions comprising: (a) from about 20 wt % to about 80 wt % of at least one polymer component; (b) from greater than about 0 wt % to about 70 wt % of a thermally conductive filler; and (c) from about 0.1 wt % to about 40 wt % of a laser activatable additive having a core-shell structure; wherein the core comprises an inorganic filler and the shell comprises a laser activatable component; wherein the combined weight percent value of all components does not exceed about 100 wt %; wherein all weight percent values are based on the total weight of the composition; and wherein a molded sample of the blended thermoplastic composition has a through plane thermal conductivity of at least about 0.40 W/m·K when determined in accordance with ASTM E1461.

19 Claims, No Drawings

(56) References Cited

U.S. PATENT DOCUMENTS

| | | | |
|---|---|---|---|
| 7,922,859 B2 | 4/2011 | Rosenberger | |
| 8,293,147 B2 | 10/2012 | Scheuer et al. | |
| 10,519,356 B2* | 12/2019 | Chua | B33Y 70/00 |
| 2012/0217434 A1 | 8/2012 | l'Abee et al. | |
| 2012/0279764 A1 | 11/2012 | Jiang et al. | |
| 2013/0062556 A1 | 3/2013 | Saga | |
| 2013/0168133 A1 | 7/2013 | Schrauwen | |
| 2014/0066560 A1 | 3/2014 | Stoppelmann et al. | |
| 2014/0353543 A1* | 12/2014 | Wu | C09K 5/14 |
| | | | 252/75 |
| 2015/0175803 A1* | 6/2015 | Stoppelmann | H05K 5/0247 |
| | | | 428/35.7 |
| 2015/0291778 A1 | 10/2015 | Musick et al. | |
| 2016/0107739 A1 | 4/2016 | Restuccia et al. | |

OTHER PUBLICATIONS

International Patent Application No. PCT/IB2018/050188; Int'l Preliminary Report on Patentability; dated Jul. 25, 2019; 8 pages.

\* cited by examiner

COMPOSITION WITH THERMAL CONDUCTIVITY AND LASER PLATING PERFORMANCE BY CORE-SHELL STRUCTURE LDS ADDITIVE WITH METAL COMPOUNDS COATED ON MINERAL FILLER SURFACE

CROSS-REFERENCE TO RELATED APPLICATION

This application is the National Stage of International Application No. PCT/IB2018/050188 filed Jan. 11, 2018, which claims the benefit of U.S. Provisional Application No. 62/444,922 filed Jan. 11, 2017, the disclosures of which are incorporated herein by this reference in their entireties.

BACKGROUND

Decreasing the dimensions and weight of components as well as increasing performance in portable electronics is a key market demand. Laser direct structuring technology is increasingly used to satisfy these needs and allows production of materials with ultra-fine precision, high reliability, improved miniaturization, and great flexibility when changing and improving functionality of the target portable electronic product. However, the reduction in size of electronic devices results in greater heat retention which can degrade device performance. Thermally conductive materials are typically used to dissipate heat in many devices such as, for example, light emitting diode (LED) lamps, e-motors, circuits, processors and coil bobbins. However, there remains a need for suitable polymer compositions that have improved thermal conductivity, while retaining required properties of laser direct structure activation, strength, and flow.

Accordingly, there is a growing need for novel thermally conductive polymer compositions comprising laser direct structuring additives which provide superior heat dissipation, strength, and flow.

SUMMARY

In one aspect, the present disclosure pertains to thermally conductive polymer composition comprising:
  a. from about 20 wt % to about 80 wt % of at least one polymer component;
  b. from greater than about 0 wt % to about 70 wt % of a thermally conductive filler and
  c. from about 0.1 wt % to about 40 wt % of a laser activatable additive having a core-shell structure; wherein the core comprises an inorganic filler and the shell comprises a laser activatable component;
  wherein the combined weight percent value of all components does not exceed about 100 wt %;
  wherein all weight percent values are based on the total weight of the composition; and
  wherein a molded sample of the blended thermoplastic composition has a through plane thermal conductivity of at least about 0.40 W/m·K when determined in accordance with ASTM E1461.

In other aspects, the invention concerns articles comprising thermally conductive polymer compositions described herein and methods of manufacturing such articles.

In various further aspects, the disclosure relates to methods of improving the thermal conductivity properties of blended thermoplastic compositions.

DETAILED DESCRIPTION

The present disclosure can be understood more readily by reference to the following detailed description of the disclosure and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to, for example, disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs.

As used in the specification and the appended claims, the singular forms "a," "an" and "the" include plural referents unless the context clearly dictates otherwise. Thus, for example, reference to "a polyamide polymer" includes mixtures of two or more polyamide polymers.

As used herein, the term "combination" is inclusive of blends, mixtures, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally substituted alkyl" means that the alkyl group can or cannot be substituted and that the description includes both substituted and unsubstituted alkyl groups.

As used herein, the term "effective amount" refers to an amount that is sufficient to achieve the desired modification of a physical property of the composition or material. For example, an "effective amount" of a thermally conductive filler refers to an amount that is sufficient to achieve the desired improvement in the property modulated by the formulation component, e.g. achieving the desired level of thermal conductivity. The specific level in terms of wt % in a composition required as an effective amount will depend upon a variety of factors including the amount and type of polyamide, amount and type of laser direct structure additive, amount and type of thermally conductive filler, and end use of the article made using the composition.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

As used herein, the terms "number average molecular weight" or "$M_n$" can be used interchangeably, and refer to the statistical average molecular weight of all the polymer chains in the sample and is defined by the formula:

$$M_n = \frac{\sum N_i M_i}{\sum N_i},$$

where $M_i$ is the molecular weight of a chain and $N_i$ is the number of chains of that molecular weight. $M_n$ can be determined for polymers, e.g., polycarbonate polymers, by methods well known to a person having ordinary skill in the art using molecular weight standards, e.g. polycarbonate standards or polystyrene standards, preferably certified or traceable molecular weight standards.

As used herein, the terms "weight average molecular weight" or "Mw" can be used interchangeably, and are defined by the formula:

$$M_w = \frac{\sum N_i M_i^2}{\sum N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

As used herein, the terms "polydispersity index" or "PDI" can be used interchangeably, and are defined by the formula:

$$PDI = \frac{M_w}{M_n}.$$

The PDI has a value equal to or greater than 1, but as the polymer chains approach uniform chain length, the PDI approaches unity.

As used herein, described particles may have a narrow particle size volume distribution that is within a range calculated via the formula below.

Particle size distribution=(D90−D10)/D50 where D represents the diameter of particles, D50 is a cumulative 50% point of diameter (or 50% pass particle or the value of the particle diameter at 50% in the cumulative distribution); D10 means a cumulative 10% point of diameter; and D90 is a cumulative 90% point of diameter; D50 is also called average particle size or median diameter. Thus, D50 may refer to the particle diameter of the powder/particulate where 50 wt % of the particles in the total distribution of the referenced sample have the noted particle diameter or smaller. Similarly, a D90 refers to the particle diameter of the powder where 90 wt % of the particles in the total distribution of the referenced sample have the noted particle diameter or smaller. Finally, a D10 may refer to particle diameter where 10 wt % of the particles in the total distribution of the referenced sample have the noted particulate diameter or smaller.

The terms "residues" and "structural units", used in reference to the constituents of the polymers, are synonymous throughout the specification.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Blended Thermoplastic Compositions

In one aspect, the present disclosure pertains to compositions comprising
a. from about 20 wt % to about 80 wt % of at least one polymer component;
b. from greater than about 0 wt % to about 70 wt % of a thermally conductive filler; and
c. from about 0.1 wt % to about 40 wt % of a laser activatable additive having a core-shell structure; wherein the core comprises an inorganic filler and the shell comprises a laser activatable component.

In various aspects, the compositions of the present disclosure further comprise an additive selected from coupling agents, antioxidants, mold release agents, UV absorbers, light stabilizers, heat stabilizers, lubricants, plasticizers, pigments, dyes, colorants, anti-static agents, nucleating agents, anti-drip agents, acid scavengers, and combinations of two or more of the foregoing. In a further aspect, compositions of the present disclosure further comprise at least one additive selected from a flame retardant, a colorant, a primary anti-oxidant, and a secondary anti-oxidant.

Polymer Component

In one aspect, the blended thermoplastic compositions of the present disclosure comprise at least one polymer component present in an amount form about 20 wt % to about 80 wt %. In various aspects, the polymer component comprises a polypropylene, a polyethylene, an ethylene-based copolymer, a polycarbonate, a polyamide, a polyester, a polyoxymethylene ("POM"), a liquid crystal polymer ("LCP"), a polyphenylene sulfide ("PPS"), a polyphenylene ether ("PPE"), a polystyrene, a acrylonitrile-butadiene-styrene terpolymer ("ABS"), an acrylic polymer, a polyetherimide ("PEI"), a polyurethane, a polyethersulphone ("PES"), a polyetheretherketone ("PEEK"), a thermoset polymer, or combinations thereof. In a further aspect, the polymer component comprises a polypropylene, a polyethylene, an ethylene-based copolymer, a polycarbonate, a polyamide, a polyester, a polyoxymethylene ("POM"), a liquid crystal polymer ("LCP"), a polyphenylene sulfide ("PPS"), a polyphenylene ether ("PPE"), a polystyrene, a acrylonitrile-butadiene-styrene terpolymer ("ABS"), an acrylic polymer, a polyetherimide ("PEI"), a polyurethane, a polyethersulphone ("PES"), or a polyetheretherketone ("PEEK"), or combinations thereof. In a still further aspect, the polymer component comprises a thermoset polymer.

In a further aspect, the polymer component is a polyamide. In a still further aspect, the disclosed blended thermoplastic compositions can comprise a polyamide polymer and a polymer selected from polycarbonate, polypropylene, polyethylene, ethylene based copolymer, polycarbonate, polyamide, polyester, polyoxymethylene, liquid crystal, polyphenylene sulfide, polyphenylene ether, polyphenylene oxide-polystyrene blend, polystyrene, high impact modified polystyrene, acrylonitrile-butadiene-styrene, terpolymer, acrylic polymer, polyetherimide, polyurethane, polyetheretherketone, polyether sulfone, and thermoset polymer, or combinations thereof.

In various aspects, the disclosed blended thermoplastic compositions can optionally omit the polyamide polymer and replace it with a polymer selected from polycarbonate, polypropylene, polyethylene, ethylene based copolymer, polycarbonate, polyamide, polyester, polyoxymethylene, liquid crystal, polyphenylene sulfide, polyphenylene ether, polyphenylene oxide-polystyrene blend, polystyrene, high impact modified polystyrene, acrylonitrile-butadiene-styrene, terpolymer, acrylic polymer, polyetherimide, polyurethane, polyetheretherketone, polyether sulfone, and thermoset polymer, or combinations thereof.

In a further aspect, the polyester is a terephthalate polyester. In a still further aspect, the terephthalate polyester comprises a polybutylene terephthalate ("PBT"), a polyethylene terephthalate ("PET"), or a polycyclohexylenedimethylene terephthalate ("PCT"), or combinations thereof. In a yet further aspect, the polyester comprises a blend of at least one polyphenylene oxide and at least one polystyrene.

Polymers such as polycarbonate, polypropylene, polyethylene, ethylene based copolymer, polycarbonate, polyamide, polyester, polyoxymethylene, liquid crystal, polyphenylene sulfide, polyphenylene ether, polyphenylene oxide-polystyrene blend, polystyrene, high impact modified polystyrene, acrylonitrile-butadiene-styrene, terpolymer, acrylic polymer, polyetherimide, polyurethane, polyetheretherketone, polyether sulfone, and thermoset polymer, or combinations thereof, generally known to skilled artisan and are within the scope of the present disclosure. The above thermoplastic polymers are either commercially available or can be readily synthesized by synthetic methods well known to those of skill in the art.

Laser Direct Structuring Additive

In addition to the thermoplastic resin, the compositions of the present disclosure also include a laser direct structuring (LDS) additive. The LDS additive is selected to enable the composition to be used in a laser direct structuring process. In an LDS process, a laser beam exposes the LDS additive to place it at the surface of the thermoplastic composition and to activate metal atoms from the LDS additive. As such, the LDS additive is selected such that, upon exposure to a laser beam, metal atoms are activated and exposed and in areas not exposed by the laser beam, no metal atoms are exposed. In addition, the LDS additive is selected such that, after being exposed to laser beam, the etching area is capable of being plated to form conductive structure. As used herein "capable of being plated" refers to a material wherein a substantially uniform metal plating layer can be plated on laser-etched area and show a wide window for laser parameters. This process is different from laser marking wherein the main outcome of laser marking is a color change in the material under the effect of energy radiation. And the key characterization for laser marking is the contrast between the mark and the substrate.

Plating index is defined as the ratio between average copper thickness obtained under a specific laser parameter of the tested sample and that of the reference sample. The reference sample was a PBT based LDS with commercial name of Pocan DP 7102. A plating index of over 0.7 is preferred.

Conversely, for LDS, the goal is the formation of metal seeds on the laser etched surface, and the final metallization layer during the following plating process. Plating rate and adhesion of plated layers are the key evaluation requirements. Color here means the substrate made from these materials itself not the color change under the laser radiation. As such, in addition to enabling the composition to be used in a laser direct structuring process, the LDS additive used in the present disclosure is also selected to help enable the composition to be colored while maintaining physical properties.

LDS compounds used in the instant invention have a core-shell (or, designated as core/shell) structure where a core is coated with a laser activatable component (the shell). The core is typically an inorganic filler such as titanium dioxide ($TiO_2$), mica or talc. Additional core materials are described herein. The shell comprises a laser activatable composition. Some shells comprise one or more of copper, gold, silver, and antimony. In some embodiments, the core comprises an inorganic filler and the shell comprises a laser activatable component comprising one or more of copper and tin. In certain embodiments, the laser activatable component comprises tin and antimony. Some preferred embodiments use a mixed metal oxide comprising tin oxide and antimony. For some compositions, the core component is about 2% to about 70% by weight, with the balance of the laser activatable additive being the shell. In certain compositions, the laser activatable additive comprises about 45 wt % to about 65 wt % core and about 35 wt % to about 55 wt % shell. Some shells comprise tin-antimony cassiterite grey [$(Sb/Sn)O_2$].

The amount of the LDS additive included is sufficient to enable plating of the track formed after activation by the laser while not adversely affecting mechanical properties.

In a further aspect, the laser direct structure additive is present in an amount from about 1 wt % to about 30 wt %. In a still further aspect, the laser direct structure additive is present in an amount from about 2 wt % to about 20 wt %. In yet a further aspect, the laser direct structure additive is present in an amount from about 7 wt % to about 18 wt %. In an even further aspect, the laser direct structure additive is present in an amount from about 5 wt % to about 15 wt %, or from about 5 wt % to about 10 wt %.

The LDS additive is selected such that, after activating with a laser, the conductive path can be formed by a standard electroless plating process. When the LDS additive is exposed to the laser, elemental metal is released. The laser draws the circuit pattern onto the part and leaves behind a roughened surface containing embedded metal particles. These particles act as nuclei for the crystal growth during a subsequent plating process, such as a copper plating process. Other electroless plating processes that can be used include, but are not limited to, gold plating, nickel plating, silver plating, zinc plating, tin plating or the like.

In some preferred embodiments, the core of the LDS additive is essentially completely covered with the shell component. In a typical embodiment, the core and the shell are of a different composition.

In some embodiments, the shell component has a thickness of from about 1 nm to about 50 µm. In certain embodiments, the core has a mean particle size of about 50 nm to about 500 µm.

In some aspects, less thermally conductive filler is required when core/shell LDS additives rather than traditional LDS additive are utilized.

LDS additives come in various shapes and sizes. Some additives are shaped as flakes, platelets, fibers, needles or spheres. In some embodiments, the size or shape may impact plating or thermoplastic composition properties, such as thermal conductivity values. In some embodiments, a flake or platelet shape is preferred.

Thermally Conductive Filler

In various aspects, the blended thermoplastic compositions of the present disclosure comprise one or more thermally conductive fillers can be used.

In a further aspect, the thermally conductive filler is selected from a high thermally conductive filler and a low thermally conductive filler; wherein the high thermally conductive filler has a thermal conductivity greater than or equal to about 50 watts per meter-kelvin W/m·K; and, wherein the low thermally conductive filler has a thermal conductivity from about 10 W/m·K to about 30 W/m·K; or a combinations thereof.

In a further aspect, the thermally conductive filler is a high thermally conductive filler. Examples of high thermally conductive filler include, but are not limited to, AlN (aluminum nitride), $Al_4C_3$ (aluminum carbide), $Al_2O_3$ (aluminum oxide), BN (boron nitride), AlON (aluminum oxynitride), $MgSiN_2$ (magnesium silicon nitride), SiC (silicon carbide), $Si_3N_4$ (silicon nitride), graphite, expanded graphite, graphene, and carbon fiber. In a still further aspect, the high thermally conductive filler is selected from AlN, $Al_4C_3$, $Al_2O_3$, BN, AlON, $MgSiN_2$, SiC, $Si_3N_4$, graphite, expanded graphite, graphene, and carbon fiber, or combinations thereof. In a still further aspect, the high thermally conductive filler is selected from AlN, $Al_2O_3$, BN, SiC, graphite, expanded graphite, and carbon fiber, or combinations thereof. In yet a further aspect, the high thermally conductive filler is selected from BN, graphite, and expanded graphite, or combinations thereof. In an even further aspect, the high thermally conductive filler is selected from AlN, $Al_2O_3$, SiC, and carbon fiber, or combinations thereof. In a still further aspect, the high thermally conductive filler is selected from BN, graphite, and expanded graphite, or combinations thereof.

In various aspects, the intrinsic thermal conductivity of the high thermally conductive filler is greater than or equal to 50 W/m·K. In a further aspect, the intrinsic thermal conductivity of the high thermally conductive filler is greater than or equal to 100 W/m·K. In a still further aspect, the intrinsic thermal conductivity of the high thermally conductive filler is greater than or equal to 150 W/m·K.

In a further aspect, the thermally conductive filler is a low thermally conductive filler. Examples of low thermally conductive fillers include, but are not limited to, ZnS (zinc sulfide), CaO (calcium oxide), MgO (magnesium oxide), ZnO (Zinc oxide), and $TiO_2$ (titanium dioxide). In a still further aspect, the low thermally conductive filler is selected from ZnS, CaO, MgO, ZnO, and $TiO_2$, or combinations thereof.

In various aspects, the intrinsic thermal conductivity of the low thermally conductive filler is from about 10 W/m·K to about 30 W/m·K. In a further aspect, the intrinsic thermal conductivity of the low thermally conductive filler is from about 15 W/m·K to about 30 W/m·K. In a still further aspect, the intrinsic thermal conductivity of the low thermally conductive filler is from about 20 W/m·K to about 30 W/m·K.

In a further aspect, the thermally conductive filler is present in an amount from about 10 wt % to about 60 wt %. In a still further aspect, the thermally conductive filler is present in an amount from about 10 wt % to about 55 wt %. In yet a further aspect, the thermally conductive filler is present in an amount from about 10 wt % to about 50 wt %. In an even further aspect, the thermally conductive filler is present in an amount from about 10 wt % to about 40 wt %. In a still further aspect, the thermally conductive filler is present in an amount from about 15 wt % to about 60 wt %. In yet a further aspect, the thermally conductive filler is present in an amount from about 20 wt % to about 60 wt %. In an even further aspect, the thermally conductive filler is present in an amount from about 20 wt % to about 50 wt %.

The graphite used in the present disclosure can be synthetically produced or naturally produced, or can be expandable graphite or expanded graphite with a thickness smaller than 1 micron. In one aspect, the graphite is naturally produced. There are three types of naturally produced graphite that are commercially available. They are flake graphite, amorphous graphite and crystal vein graphite. In one aspect, the graphite is flake graphite, wherein the flake graphite is typically found as discrete flakes ranging in size from 10-800 or 200-800 nm micrometers in diameter and 1-150 or 100-150 micrometers thick and purities ranging from 80-99.9% carbon. In another aspect the graphite is spherical.

The boron nitride used in the disclosure is typically hexagonal boron nitride (h-BN), which can be complete h-BN or turbostratic (random-layer lattice structure) boron nitride (t-BN). The BN particle can be large sized single BN crystal powder, agglomerate of small sized BN particles, the mixture thereof, the agglomerated spherical powder, or BN fiber. In one aspect, the BN average particle size or D50 in diameter can range from 1 to 500 or 100 to 500 micrometers. In another aspect, within this range, the boron nitride particles have a size of greater than or equal to about 3, or greater than or equal to about 5 micrometers. The particle size indicated here means the single BN particle or its agglomerate at any of their dimensions. In one aspect, the BN has a BN purity ranging from 95% to 99.8%. In one aspect, a large single crystal sized flake BN with an average size ranging from 3 to 50 micrometer and a BN purity of over 98% is used.

In a further aspect, the thermally conductive filler comprises a sizing or coating material. In a still further aspect, the thermally conductive filler is coated with an amino-silane, polyurethane, vinyl-silane, epoxy-silane, or epoxy. In a yet further aspect, the blended thermoplastic composition comprises a polyamide; and at least one thermally conductive filler coated with an amino silane.

Low Thermally Insulating Filler

In various aspects, the blended thermoplastic compositions of the present disclosure can further comprise one or more low thermally insulating fillers can be used. Examples of low thermally insulating fillers include, but are not limited to, steatite $(H_2Mg_3(SiO_3)_4)$ (Talc), $CaCO_3$ (calcium carbonate), $Mg(OH)_2$ (magnesium hydroxide), mica, BaO (barium oxide), γ-AlO(OH) (boehmite), α-AlO(OH) (diaspore), $Al(OH)_3$ (gibbsite), $BaSO_4$ (barium sulfate), $CaSiO_3$ (wollastonite), $ZrO_2$ (zirconium oxide), $SiO_2$ (silicon oxide), glass beads, glass fiber, $MgO.xAl_2O_3$ (magnesium aluminate), $CaMg(CO_3)_2$ (dolomite), ceramic-coated graphite, and various types of clay, or a combinations thereof.

In a further aspect, the low thermally insulating filler has an intrinsic thermal conductivity less than or equal to about 10 W/m·K. In a still further aspect, the intrinsic thermal conductivity of the low thermally insulating filler is less than or equal to about 7.5 W/m·K. In a yet further aspect, the intrinsic thermal conductivity of the low thermally insulating filler is less than or equal to about 5 W/m·K.

Optional Filler

The disclosed polymer compositions further comprise an reinforcing filler, such as, for example, an inorganic filler or reinforcing agent. The specific composition of a filler, can vary, provided that the filler is chemically compatible with the remaining components of the polymer composition. In one aspect, the polymer composition comprises a mineral filler. In another aspect, the polymer composition comprises a filler comprising talc. In another aspect, the polymer composition comprises a filler comprising a carbon fiber. In another aspect, the polymer composition comprises a filler comprising a glass fiber.

In a further aspect, the disclosed polymer compositions further comprise a filler selected from amino-silane treated fillers, polyurethane treated fillers, vinyl-silane treated fillers, epoxy-silane treated fillers, and epoxy treated fillers, or a combination thereof.

In another aspect, an exemplary filler can comprise silicates and silica powders, such as aluminum silicate (mullite), synthetic calcium silicate, zirconium silicate, fused silica, crystalline silica graphite, natural silica sand, or the like; boron powders, boron-silicate powders, or the like; oxides, such as aluminum oxide, magnesium oxide, or the like; calcium sulfate (as its anhydride, dihydrate or trihydrate), or the like; glass spheres such as hollow and solid glass spheres, silicate spheres, aluminosilicate, or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers), sulfides such as molybdenum sulfide, zinc sulfide or the like; and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, or the like; combinations comprising at least one of the foregoing fillers or reinforcing agents.

Optional Polymer Composition Additives

The disclosed polymer compositions can optionally comprise one or more additives conventionally used in the manufacture of molded thermoplastic parts with the proviso that the optional additives do not adversely affect the desired properties of the resulting composition. Mixtures of optional additives can also be used. Such additives can be mixed at a suitable time during the mixing of the components for forming the composite mixture. For example, the disclosed compositions can comprise one or more lubricants, plasticizers, ultraviolet light absorbing additives, anti-dripping agents, dyes, pigments, stabilizers, anti-static agents, flame-retardants, impact modifiers, colorants, antioxidant, and/or mold release agents. In one aspect, the composition further comprises one or more optional additives selected from an antioxidant, flame retardant, and stabilizer. In a further aspect, the composition further comprises a flame retardant.

Exemplary heat stabilizers include, for example, organophosphites such as triphenylphosphite, tris-(2,6-dimethylphenyl)phosphite, tris-(mixed mono-and di-nonylphenyl) phosphite or the like; phosphonates such as dimethylbenzenephosphonate or the like, phosphates such as trimethyl phosphate, or the like, or combinations including at least one of the foregoing heat stabilizers. Heat stabilizers are generally used in amounts of from 0.01 to 0.5 parts by weight based on 100 parts by weight of the total composition, excluding any filler.

Exemplary antioxidants include, for example, organophosphites such as tris(nonyl phenyl)phosphite, tris(2,4-di-t-butylphenyl)phosphite, bis(2,4-di-t-butylphenyl)pentaerythritoldiphosphite, distearylpentaerythritoldiphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylatedthiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations including at least one of the foregoing antioxidants. Antioxidants are generally used in amounts of from 0.01 to 0.5 parts by weight, based on 100 parts by weight of the total composition, excluding any filler.

Exemplary light stabilizers include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers are generally used in amounts of from 0.1 to 1.0 parts by weight, based on 100 parts by weight of the total composition, excluding any filler.

Exemplary plasticizers include, for example, phthalic acid esters such as dioctyl-4,5-epoxy-hexahydrophthalate, tris-(octoxycarbonylethyl) isocyanurate, tristearin, epoxidized soybean oil or the like, or combinations including at least one of the foregoing plasticizers. Plasticizers are generally used in amounts of from 0.5 to 3.0 parts by weight, based on 100 parts by weight of the total composition, excluding any filler.

Exemplary antistatic agents include, for example, glycerol monostearate, sodium stearylsulfonate, sodium dodecylbenzenesulfonate or the like, or combinations of the foregoing antistatic agents. In one aspect, carbon fibers, carbon nanofibers, carbon nanotubes, carbon black, or any combination of the foregoing can be used in a polymeric resin containing chemical antistatic agents to render the composition electrostatically dissipative.

Exemplary mold releasing agents include for example, metal stearate, stearyl stearate, pentaerythritoltetrastearate, beeswax, montan wax, paraffin wax, or the like, or combinations including at least one of the foregoing mold release agents. Mold releasing agents are generally used in amounts of from 0.1 to 1.0 parts by weight, based on 100 parts by weight of the total composition, excluding any filler.

Exemplary UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy] methyl]propane; (UVINUL™ 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl) oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight of the total composition, excluding any filler.

Exemplary lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from 0.1 to 5 parts by weight, based on 100 parts by weight of the total composition, excluding any filler.

Exemplary blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of from 1 to 20 parts by weight, based on 100 parts by weight of the total composition, excluding any filler.

As noted above, the disclosed polymer compositions can optionally further comprise a flame retardant additive. In various aspects, the flame retardant additive can comprise any flame retardant material or mixture of flame retardant materials suitable for use in the inventive polymer compositions.

In a further aspect, the flame retardant additive comprises a phosphate containing material. In a yet further aspect, the flame retardant additive comprises a phosphate containing material selected from a phosphine, a phosphine oxide, a bisphosphine, a phosphonium salt, a phosphinic acid salt, a phosphoric ester, and a phosphorous ester, or a combination thereof.

In a further aspect, the flame retardant additive comprises a halogen containing material. In other aspects, the flame retardant additive is free of or substantially free of one or more of phosphate and/or a halogen.

In a further aspect, the flame retardant additive comprises an oligomer organophosphorous flame retardant, including for example, bisphenol A diphenyl phosphate (BPADP). In a yet further aspect, the flame retardant is selected from aromatic polyphosphate oligomers, phenoxyphosphazene oligomers, melamine polyphosphate oligomers, and metal phosphinate oligomers, or a combination thereof. In a still further aspect, the flame retardant is selected from oligomeric phosphate, polymeric phosphate, oligomeric phosphonate, or mixed phosphate/phosphonate ester flame retardant compositions. In an even further aspect, the flame retardant is selected from bisphenol-A bis(diphenyl phosphate), 1,3-phenylene tetraphenyl ester, bisphenol-A bis(diphenyl phosphate), red phosphorous, and Clariant Exolite™ OP series FR, or a combination thereof. In a still further aspect, the flame retardant is selected from triphenyl phosphate; cresyldiphenylphosphate; tri(isopropylphenyl)phosphate; resorcinol bis(diphenylphosphate); and bisphenol-A bis(diphenyl phosphate). In a yet further aspect, the flame retardant is bisphenol-A bis(diphenyl phosphate).

Additionally, materials to improve flow and other properties can be added to the composition, such as low molecular weight hydrocarbon resins. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g., pentenes, hexenes, heptenes and the like; diolefins, e.g., pentadienes, hexadienes and the like; cyclic olefins and diolefins, e.g., cyclopentene, cyclopentadiene, cyclohexene, cyclohexadiene, methyl cyclopentadiene and the like; cyclic diolefindienes, e.g., dicyclopentadiene, methylcyclopentadiene dimer and the like; and aromatic hydrocarbons, e.g., vinyltoluenes, indenes, methylindenes and the like. The resins can additionally be partially or fully hydrogenated.

Methods of Manufacture

The compositions of the present disclosure can be blended with the aforementioned ingredients by a variety of methods involving intimate admixing of the materials with any additional additives desired in the formulation. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 230° C. and about 350° C. in the molten resin composition, although higher temperatures can be used provided that the residence time of the resin in the processing equipment is kept short. In some embodiments the melt processed composition exits processing equipment such as an extruder through small exit holes in a die. The resulting strands of molten resin are cooled by passing the strands through a water bath. The cooled strands can be chopped into small pellets for packaging and further handling.

Compositions can be manufactured by various methods. For example, polymer, and/or other optional components are first blended, optionally with fillers in a HENSCHEL-Mixer high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

In one aspect, the laser direct structuring process involves three steps: 1) injection molding, 2) laser structuring, and 3) metallizing.

In a further aspect, during the injection molding step, the laser direct structuring additive and reinforcing filler can be mixed with the thermoplastic polymer. In another aspect, the blend composition further comprises one or more optional additives selected from an antioxidant, flame retardant, inorganic filler, and stabilizer. In a still further aspect, single shot injection molding can be used to produce the parts or articles to be laser structured. In at least one aspect, the polymer composition can be mixed at this step and used in the LDS process. In another aspect, additional ingredients can be added to the polymer composition after this step.

In a further aspect, during the laser structuring step, a laser is used to form a conductive path during the laser structuring step. In a still further aspect, the laser used to form a conductive path is laser direct structuring. In a yet further aspect, laser direct structuring comprises laser etching. In an even further aspect, laser etching is carried out to provide an activated surface.

In a further aspect, at least one laser beam draws at least one pattern on the surface of the polymer composition during the laser structuring step. In a still further aspect, the employed filler composition can release at least one metallic nucleus. In a yet further aspect, the at least one metallic nucleus that has been released can act as a catalyst for reductive copper plating process.

Laser direct structuring is can be carried out on an article comprising the disclosed blended thermoplastic compositions at a power setting from about 1 watts (W) to about 14 W, a frequency from about 30 kilohertz (kHz) to about 120 kHz, and a speed of about 1 meter per second (m/s) to about 5 m/s. In a further aspect, laser etching is carried out at about 1 w to about 10 w power with a frequency from about 30 kHz to about 110 kHz and a speed of about 1 m/s to about 5 m/s. In a still further aspect, laser etching is carried out at about 1 w to about 10 w power with a frequency from about 40 kHz to about 100 kHz and a speed of about 2 m/s to about 4 m/s. In a yet further aspect, laser etching is carried out at about 3.5 w power with a frequency of about 40 kHz and a speed of about 2 m/s.

In various aspects, laser direct structuring is carried out on an article comprising the disclosed blended thermoplastic compositions at a power setting of about 2 W. In a further aspect, laser direct structuring is carried out on an article comprising the disclosed blended thermoplastic compositions at a power setting of about 3 W. In a still further aspect, laser direct structuring is carried out on an article comprising the disclosed blended thermoplastic compositions at a power setting of about 4 W. In a yet further aspect, laser direct structuring is carried out on an article comprising the disclosed blended thermoplastic compositions at a power setting of about 5 W. In an even further aspect, laser direct structuring is carried out on an article comprising the disclosed blended thermoplastic compositions at a power setting of about 6 W. In a still further aspect, laser direct structuring is carried out on an article comprising the disclosed blended thermoplastic compositions at a power setting of about 7 W. In a yet further aspect, laser direct structuring is carried out on an article comprising the disclosed blended thermoplastic compositions at a power setting of about 8 W. In an even further aspect, laser direct structuring is carried out on an article comprising the disclosed blended thermoplastic compositions at a power setting of about 9 W. In a still further aspect, laser direct structuring is carried out on an article comprising the disclosed blended thermoplastic compositions at a power setting of about 10 W. In a yet further aspect, laser direct structuring is carried out on an article comprising the disclosed blended thermoplastic compositions at a power setting of about 11 W.

In various aspects, laser direct structuring is carried out on an article comprising the disclosed blended thermoplastic compositions at a frequency setting of about 40 kHz. In a further aspect, laser direct structuring is carried out on an article comprising the disclosed blended thermoplastic compositions at a frequency setting of about 50 kHz. In a still further aspect, laser direct structuring is carried out on an article comprising the disclosed blended thermoplastic compositions at a frequency setting of about 60 kHz. In a yet further aspect, laser direct structuring is carried out on an article comprising the disclosed blended thermoplastic compositions at a frequency setting of about 70 kHz. In an even further aspect, laser direct structuring is carried out on an article comprising the disclosed blended thermoplastic compositions at a frequency setting of about 80 kHz. In a still further aspect, laser direct structuring is carried out on an article comprising the disclosed blended thermoplastic compositions at a frequency setting of about 90 kHz. In a yet further aspect, laser direct structuring is carried out on an article comprising the disclosed blended thermoplastic compositions at a frequency setting of about 100 kHz. In an even further aspect, laser direct structuring is carried out on an article comprising the disclosed blended thermoplastic compositions at a frequency setting of about 110 kHz. In a still further aspect, laser direct structuring is carried out on an article comprising the disclosed blended thermoplastic compositions at a frequency setting of about 120 kHz.

In various aspects, laser direct structuring is carried out on an article comprising the disclosed blended thermoplastic compositions at a speed of about 1 m/s. In a further aspect, laser direct structuring is carried out on an article comprising the disclosed blended thermoplastic compositions at a speed of about 2 m/s. In a still further aspect, laser direct structuring is carried out on an article comprising the disclosed blended thermoplastic compositions at a speed of about 3 m/s. In a yet further aspect, laser direct structuring is carried out on an article comprising the disclosed blended thermoplastic compositions at a speed of about 4 m/s. In an even further aspect, laser direct structuring is carried out on an article comprising the disclosed blended thermoplastic compositions at a speed of about 5 m/s.

In a further aspect, a rough surface can form in the LDS process. In a still further aspect, the rough surface can entangle the copper plate with the polymer matrix in the polymer composition, which can provide adhesion between the copper plate and the polymer composition. The metalizing step can, in various aspects, be performed using conventional techniques. For example, in one aspect, an electroless copper plating bath is used during the metallization step in the LDS process. Thus, in various aspects, plating a metal layer onto a conductive path is metallization. In a still further aspect, metallization can comprise the steps: a) cleaning the etched surface; b) additive build-up of tracks; and c) plating.

In a further aspect, the polymer component of the method comprises a polyamide polymer. In a still further aspect, the polyamide polymer is present in an amount from about 30 wt % to about 90 wt % of the thermoplastic composition.

Articles of Manufacture

Shaped, formed, or molded articles including the polymer compositions are also provided. The polymer compositions can be molded into useful shaped articles by a variety of means such as injection molding, extrusion, rotational molding, blow molding and thermoforming to form articles such as, for example, personal computers, notebook and portable computers, cell phone antennas and other such communications equipment, medical applications, radio frequency identification (RFID) applications, automotive applications, and the like.

The blended polymer compositions, disclosed herein provide robust plating performance while maintaining good mechanical properties. Evaluation of the mechanical properties can be performed through various tests, such as Izod impact test (notched and/or unnotched), Charpy test, Gardner test, etc., according to several standards (e.g., ASTM D256). Robustness of plating performance can be measured via a performance ranking, or plating ranking, ranging from top performance (e.g., "best") to bottom performance. The ranking can be partitioned in various levels. In one aspect, a plating ranking can have a level of "10" for top performance and a level of "0" for bottom performance.

In a further aspect, the method comprises forming a molded part from the composition. In another aspect, the method further comprises subjecting the molded part to a laser direct structuring process.

In one aspect, the article comprises the product of extrusion molding or injection molding a composition comprising a thermoplastic polymer, a laser directing structuring additive and a reinforcing filler.

In a further aspect, the molded article further comprises a conductive path formed by activation with a laser. In a yet further aspect, the article further comprises a metal layer plated onto the conductive path. In an even further aspect, the metal layer is a copper layer. In a still further aspect, the metal layer has a thickness of about 0.8 micrometers (µm) or higher as measured according to ASTM B568.

In various aspects, the polymer composition can be used in the field of electronics. In a further aspect, non-limiting examples of fields which can use the disclosed blended polymer compositions include electrical, electro-mechanical, Radio Frequency (RF) technology, telecommunication, automotive, aviation, medical, sensor, military, and security. In a still further aspect, the use of the disclosed blended polymer compositions can also be present in overlapping fields, for example in mechatronic systems that integrate mechanical and electrical properties which may, for example, be used in automotive or medical engineering.

In one aspect, molded articles according to the present disclosure can be used to produce a device in one or more of the foregoing fields. In a still further aspect, non-limiting examples of such devices in these fields which can use the disclosed blended polymer compositions according to the present disclosure include computer devices, household appliances, decoration devices, electromagnetic interference devices, printed circuits, Wi-Fi devices, Bluetooth devices, global position system (GPS) devices, cellular antenna devices, smart phone devices, automotive devices, military devices, aerospace devices, medical devices, such as hearing aids, sensor devices, security devices, shielding devices, RF antenna devices, LED devices, or RFID devices. In yet a further aspect, the device is selected from a computer device, electromagnetic interference device, automotive device, medical device such as a shadowless lamp, sensor device, security device, shielding device, RF antenna device, LED device and RFID device. In an even further aspect, the device is selected from a computer device, sensor device, security device, RF antenna device, LED device and RFID device. In a still further aspect, the device is selected from a computer device, LED device and RFID device. In yet a further aspect, the device is a LED device. In an even further aspect, the device is a LED lamp.

In a still further aspect, the molded articles can be used to manufacture devices in the automotive field. In a further aspect, non-limiting examples of such devices in the automotive field which can use the disclosed blended polymer compositions in the vehicle's interior include adaptive cruise control, headlight sensors, windshield wiper sensors, and door/window switches. In a further aspect, non-limiting examples of devices in the automotive field which can use the disclosed blended polymer compositions in the vehicle's exterior include pressure and flow sensors for engine management, air conditioning, crash detection, and exterior lighting fixtures.

In a further aspect, the resulting disclosed compositions can be used to provide any desired shaped, formed, or molded articles. For example, the disclosed compositions can be molded into useful shaped articles by a variety of means such as injection molding, extrusion, rotational molding, blow molding and thermoforming. As noted above, the disclosed compositions are particularly well suited for use in the manufacture of electronic components and devices. As such, according to some aspects, the disclosed compositions can be used to form articles such as printed circuit board carriers, burn in test sockets, flex brackets for hard disk drives, and the like.

In various aspects, a molded article comprising the disclosed blended thermoplastic compositions can have a melt volume rate ("MVR") from about 2.5 cubic centimeters per 10 minutes ($cm^3/10$ min) to about 7.5 $cm^3/10$ min when determined in accordance with ASTM D1238 under a load of 2.16 kilograms (kg) and at a temperature of 300° C.

In various aspects, a molded article comprising the disclosed blended thermoplastic compositions can have a modulus of elasticity from about 2,000 megapascals (MPa) to about 4,000 MPa when determined in accordance with ASTM D638 at a speed of 5 millimeters per minute (mm/min).

While colorants or dyes or pigments may be used in the present invention, they are not required. These colorants may be used because the natural color of the composition is much lighter than previous LDS compositions using an LDS additive that resulted in a composition that was black, or close to black, such that no colorant may have been effective. Accordingly, the compositions of the present invention have, in one embodiment, an L* value of 40 to 95 or 40 to 85. In an alternative embodiment, the compositions of the present invention have, in one embodiment, an L* value of 45 to 80. In yet another alternative embodiment, the compositions of the present invention have, in one embodiment, an L* value of 50 to 75. The "L* value" describes the lightness-darkness property. If the L* value:0, the object is black. If the L* value:100 the object is white. The L* value is always positive.

Compositions having an L* value further away from the extremes (0 and 100) have a more natural color, which may be the selected color for a specific application or which may enable the composition to be more easily colored. L* is measured using ASTM 2244 With 10 degree observer; D65 illuminant; specular component included (SCI) reflectance; and large aperture). The compositions having a L* of 40 to 85 results in the compositions having color space that could be achieved based on this light color naturally in the range of from 28 to 94. As used herein, the L* of the material naturally is the value of material without any colorant. Having values further away from 0 for L* results in a composition that has a much wider "color space". The "color space" is the range of L* that can be achieved using an optional colorant, pigment and/or dye. The compositions of the present invention have a much larger color space as compared to prior art LDS compositions, such that the compositions of the present invention are colorable.

The color properties of the composition may also be defined using the a* and b* values. The a* value describes the position on a red-green axis. If a* is positive, the shade is red and if a* is negative, the shade is green. The b* value describes the position on a yellow-blue axis. If b* is positive, the shade is yellow and if b* is negative, the shade is blue. When a* and b* are near zero and L is bigger, the result is a lighter color for the composition. For compositions of the present invention, it is beneficial for the a* and b* values naturally occurring in the compositions to be closer to zero since, as before, this enables a much larger color space to be achieved. In one embodiment, the compositions have an a* value of from −1 to −5 and a b* value of from −5 to 20. This results in a color space capable of being achieved by the compositions of −50 to 52 for a* and −40 to 80 for b*. Again, as may be seen, since the compositions of the present invention utilize an LDS additive that is not darker in nature, a much wider array of color possibilities is possible. ASTM 2244 is also used to determine a* and b* values.

In various aspects, the present disclosure pertains to and includes at least the following aspects.

Aspect 1A. A thermally conductive polymer composition comprising:
- a. from about 20 wt % to about 80 wt % of at least one polymer component;
- b. from greater than about 0 wt % to about 70 wt % of a thermally conductive filler; and
- c. from about 0.1 wt % to about 40 wt % of a laser activatable additive having a core-shell structure; wherein the core comprises an inorganic filler and the shell comprises a laser activatable component;
- wherein the combined weight percent value of all components does not exceed about 100 wt %;

wherein all weight percent values are based on the total weight of the composition; and
- wherein a molded sample of the blended thermoplastic composition has a through plane thermal conductivity of at least about 0.40 W/m·K when determined in accordance with ASTM E1461.

Aspect 1B. A thermally conductive polymer composition consisting essentially of:
- a. from about 20 wt % to about 80 wt % of at least one polymer component;
- b. from greater than about 0 wt % to about 70 wt % of a thermally conductive filler; and
- c. from about 0.1 wt % to about 40 wt % of a laser activatable additive having a core-shell structure; wherein the core comprises an inorganic filler and the shell comprises a laser activatable component;

wherein the combined weight percent value of all components does not exceed about 100 wt %;
wherein all weight percent values are based on the total weight of the composition; and
wherein a molded sample of the blended thermoplastic composition has a through plane thermal conductivity of at least about 0.40 W/m·K when determined in accordance with ASTM E1461.

Aspect 1C. A thermally conductive polymer composition consisting of:
a. from about 20 wt % to about 80 wt % of at least one polymer component;
b. from greater than about 0 wt % to about 70 wt % of a thermally conductive filler; and
c. from about 0.1 wt % to about 40 wt % of a laser activatable additive having a core-shell structure; wherein the core comprises an inorganic filler and the shell comprises a laser activatable component;
wherein the combined weight percent value of all components does not exceed about 100 wt %;
wherein all weight percent values are based on the total weight of the composition; and
wherein a molded sample of the blended thermoplastic composition has a through plane thermal conductivity of at least about 0.40 W/m·K when determined in accordance with ASTM E1461.

Aspect 2. The composition of any of Aspects 1A-1C, wherein the polymer component comprises a polypropylene, polyethylene, ethylene based copolymer, polycarbonate, polyamide, polyester, polyoxymethylene (POM), polybutylene terephthalate (PBT), polyethylene terephthalate (PET), polycyclohexylendimethylene terephthalate (PCT), liquid crystal polymer (LPC), polyphenylene Sulfide (PPS), polyphenylene ether (PPE), polyphenylene oxide-polystyrene blend, polystyrene, high impact modified polystyrene, acrylonitrile-butadiene-styrene (ABS) terpolymer, acrylic polymer, polyetherimide (PEI), polyurethane, polyetheretherketone (PEEK), poly ether sulphone (PES), polyphthalamide (PPA), or combinations thereof.

Aspect 3. The composition of any of Aspects 1A-2, wherein the polymer component comprises polycarbonate, polyetheretherketone, polyetherimide or polyphthalamide or a combination thereof.

Aspect 4. The composition of any preceding Aspects, comprising from greater than about 0 wt % to about 50 wt %, or from greater than 0 wt % to about 30 wt %, or from greater than 0 wt % to about 10 wt % of thermally conductive filler.

Aspect 5. The composition of any preceding Aspects, comprising from 0.1 wt % to 20 wt %, or from 0.1 wt % to 10 wt %, or from 0.1 wt % to 5 wt % laser activatable additive.

Aspect 6. The composition of any preceding Aspects, wherein the thermally conductive filler is a high thermally conductive filler having a thermal conductivity greater than or equal to about 50 W/m·K; or a low thermally conductive filler having a thermal conductivity from about 10 W/m·K to about 30 W/m·K; or a combinations thereof.

Aspect 7. The composition of Aspect 6, wherein the high thermally conductive filler is selected from the group consisting of aluminum nitride AlN, aluminum carbide $Al_4C_3$, aluminum oxide $Al_2O_3$, boron nitride BN, aluminum oxynitrides AlON, magnesium silicon nitride $MgSiN_2$, silicon carbide SiC, silicon nitride $Si_3N_4$, graphite, expanded graphite, graphene, carbon fiber, and combinations thereof.

Aspect 8. The composition of Aspect 6 or 7, wherein the low thermally conductive filler is selected from the group consisting of $Mg(OH)_2$ (Magnesium hydroxide), steatite $H_2Mg_3(SiO_3)_4$ (Talc), γ-AlO(OH) (Boehmite), α-AlO(OH) (Diaspore), $Al(OH)_3$ (Gibbsite), $CaCO_3$, mica, BaO, $BaSO_4$, $CaSiO_3$, $ZrO_2$, $SiO_2$, glass beads, $MgO·xAl_2O_3$, $CaMg(CO_3)_2$, ceramic-coated graphite, clay, and combinations thereof.

Aspect 9. The composition of any preceding Aspect, wherein the laser activatable additive shell is a metal, metal oxide, or mixed-metal oxide.

Aspect 10. The composition of any preceding Aspect, wherein the inorganic component core is a metal oxide, mica, talc, AlN, $Al_4C_3$, $Al_2O_3$, BN, AlON, $MgSiN_2$, SiC, $Si_3N_4$, graphite, expanded graphite, graphene, carbon fiber, ZnS, CaO, MgO, ZnO, $TiO_2$, $Mg(OH)_2$, γ-AlO(OH) (Boehmite), α-AlO(OH) (Diaspore), $Al(OH)_3$ (Gibbsite), $CaCO_3$, BaO, $BaSO_4$, $CaSiO_3$, $ZrO_2$, $SiO_2$, glass beads, $MgO·xAl_2O_3$, $CaMg(CO_3)_2$, clay and a combination comprising at least one of the foregoing fillers.

Aspect 11. The composition of any preceding Aspect, wherein the shell component has a thickness of from about 1 nm to about 50 μm.

Aspect 12. The composition of any preceding Aspect, wherein the shell component has a thickness of from about 1 nm to about 20 μm.

Aspect 13. The composition of any preceding Aspects, wherein the core has a mean particle size of about 50 nm to about 500 μm.

Aspect 14. The composition of any preceding Aspects, wherein the core has a mean particle size of about 50 nm to about 100 μm.

Aspect 15. The composition of any preceding Aspect, wherein the core component is about 2% to about 70% by weight, with the balance of the laser activatable additive being the shell.

Aspect 16. The composition of any preceding Aspect, further comprising glass fiber.

Aspect 17. The composition of any preceding Aspect, further comprising an organic or inorganic flame retardant.

Aspect 18. The composition of any preceding Aspect, the polymer component further comprising a chemical reactive or non-chemical reactive impact modifier.

Aspect 19. The composition of any preceding Aspect, further comprising an additive comprising an antioxidant, a lubricant, a thermal stabilizer, an ultraviolet light absorbing additive, a plasticizer, an anti-dripping agent, a mold release agent, an antistatic agent, a dye, a pigment, or a radiation stabilizer, or a combination thereof.

Aspect 20. The composition of any preceding Aspect, wherein a molded sample of the composition exhibits a plating index value of at least about 0.6.

Aspect 21. An article comprising a composition of any preceding Aspect.

Aspect 22. The article of Aspect 21, wherein the article is selected from a computer device, electromagnetic interference device, printed circuit, Wi-Fi device, Bluetooth device, global positioning system GPS device, cellular antenna device, smart phone device, automotive device, medical device, sensor device, security device, shielding device, shadowless lamp, radio frequency RF antenna device, light emitting diode LED device and radio frequency identification RFID device.

Aspect 23. A method of manufacturing an article comprising molding an article from the composition of Aspect 1, exposing the laser activatable additive to a laser to form an activated area, and plating a metal layer onto the activate area.

Aspect 23. A thermally conductive polymer composition of any of Aspects 1A-1C, comprising:
  a. from about 50 wt % to about 70 wt % of the polymer component;
  b. from about 10 wt % to about 20 wt % of the thermally conductive filler; and
  c. from about 2 wt % to about 10 wt % of the laser activatable additive;
  wherein a molded sample of the blended thermoplastic composition exhibits a plating index value of at least about 0.6.

Without further elaboration, it is believed that one skilled in the art can, using the description herein, utilize the present disclosure. The following examples are included to provide addition guidance to those skilled in the art of practicing the claimed disclosure. The examples provided are merely representative of the work and contribute to the teaching of the present disclosure. Accordingly, these examples are not intended to limit the disclosure in any manner.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present disclosure is not entitled to antedate such publication by virtue of prior disclosure. Further, the dates of publication provided herein can be different from the actual publication dates, which can require independent confirmation.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

The materials shown in Table 1 were used to prepare the compositions described and evaluated herein. All samples were prepared by melt extrusion on a Toshiba Twin screw extruder, using different melt temperature and RPM according to different base resin. Tests were all conducted in accordance with ASTM standards, referenced in each test below.

Melt Volume-flow Rate ("MVR") was determined in accordance with ASTM D1238. Units are cubic centimeters per 10 minutes ($cm^3/10$ min)

Izod impact strength was determined at 23° C. on 3.2 mm thick injection molded samples in accordance with ASTM D256 (notched Izod impact strength, "NII"), and in accordance with ASTM D4812 (unnotched Izod impact strength, "UII"). Units are joules per meter (J/m).

Heat deflection temperature ("HDT" was determined at 1.82 MPa on injection molded samples (3.2 mm×12.5 mm bars) in accordance with ASTM D648.

Plating index was determined in accordance with ASTM B568 by testing the copper thickness using X-Ray Fluorescence ("XRF"). Briefly, LDS is carried out on molded plaques with laser power, frequency, and speed varied as indicated. A reference sample for XRF determinations was prepared using Pocan™ DP 7102 with copper plating at about 5 μm. Copper thickness was determined on the reference sample on both sides and at four discrete sample points. The copper thickness values were averaged for the reference sample and the average value is referred to $X_{ref}$. The plating index is defined by the following equation:

$$\text{Plating index} = \frac{\text{Average copper thickness for one parameter field}}{\text{Average copper thickness for reference sick } X_{ref}}$$

Thermal conductivity ("TC") was conducted in accordance with ASTM E1461 measured using a Nanoflash™ LFA 447 xenon flash apparatus (Netzsch Group). The reference standard was pyroceram of similar thickness. Measurements are provided in units of κ (W/m·K). The measurement determines the thermal diffusivity (α, square centimeters per second, $cm^2/s$) and the specific heat (Cp, joules per gram Kelvin, J/gK) of the sample, together with the density (ρ, grams per cubic centimeter, $g/cm^3$). Density was determined using a water immersion method (ASTM D792). The product of three values (α, ρ, and Cp) gives the thermal conductivity in the through plane according to the following equation:

$$κ=α(T)×Cp(T)×ρ(T).$$

TABLE 1

Materials list in the examples

| Component | Chemical description | Source |
|---|---|---|
| Sebacic acid/BPA/PCP polyestercarbonate | HFD PC_high Mw (about 35,400 g/mol), CAS: 137397-37-6 | SABIC |
| Sebacic Acid/BPA copolymer | HFD PC_Low Mw (about 21,500 g/mol), CAS: 137397-37-6 | SABIC |

TABLE 1-continued

Materials list in the examples

| Component | Chemical description | Source |
|---|---|---|
| Opaque PC-Siloxane copolymer | 20% PC/SILOXANE COPOLYMER, paracumyl phenol PCP ENDCAPPED, CAS: 202483-49-6 | SABIC |
| THPE Branched PC Powder | THPE Branched PC Resin, CAS: 111211-39-3 | SABIC |
| SAN encapsulated PTFE - intermediate resin | ENCAPSULATED PTFE, CAS: 9003-54-7, 9002-84-0 | SABIC |
| TALC | Talc, CAS: 14807-96-6 | Hayashi Kasei |
| Boron Nitride BNHN | Boron Nitride (BNHN, 10 μm) CAS: 10043-11-5 | Dandong Chemical Engineering Institute Co., Ltd. |
| Boehmite | BG611, CAS: 1318-23-6 | Estone |
| Graphite | Graphite, CAS: 7782-42-5 | Asbury |
| HINDERED PHENOL ANTI-OXIDANT | HINDERED PHENOL ANTI-OXIDANT, Irganox 1076, CAS: 002082-79-3 | Ciba Specialty Chemicals (China) Ltd. |
| PENTAERYTHRITOL TETRASTEARATE | PENTAERYTHRITOL TETRASTEARATE, CAS: 115-83-3 | Faci Asia Pacific PTE LTD |
| Irgafos 168 | Tris(2,4-ditert-butylphenyl) phosphite CAS: 31570-04-4 | Ciba |
| $H_3PO_3$ | Phosphorous acid, 50% water solution CAS: 13598-36-2 | Sinopharm Chemical Reagent Co., Ltd |
| SFR100 | Silicone additive | Momentive |
| HDPE | High density polyethylene CAS: 25087-34-7 | SABIC |
| VA1803 | Maleated EP copolymer: EXXELOR VA1803, CAS: 31069-12-2 | ExxonMobil Chemical |
| EXL3330 | ACRYLIC POLYMER IMPACT MODIFIER: EXL3330, CAS: 25852-37-3, 471-34-1 | Rohm Haas |
| EAAZ | Aclyn295 Ethylene-acrylic acid Zinc Ionomers CAS: 28208-80-2 | Honeywell |
| 7330 | Pigment grey, CAS: 12001-26-2/14807-96-6/68187-54-2 | Merck |
| 8850 | Pigment grey, CAS: 1317-80-2/ 68187-54-2 | Merck |
| 8825 | Pigment blue-grey, CAS: 12001-26-2/ 68187-54-2 | Merck |

The materials used in preparing the samples are listed in Table 1 and were prepared using a Twin screw extruder (Toshiba TEM-37BS, L/D=40.5) with the temperature of the extruder barrel set at 260° C. Pellets extruded from the extruder were then injection molded into 80×10×3 mm bar, cut into 10×10×3 mm square sample for through plane thermal conductivity measurement, Φ100×0.4 mm sheet and cut into Φ25×0.4 mm round sample for in plane thermal conductivity measurement.

Exemplary formulations are shown in Table 2, using the materials shown in Table 1. All materials are provided in wt % wherein all weight percent values are based on the total weight of the given formulation.

TABLE 2

| | | C1.1 | EX1.1 | EX1.2 | EX1.3 | EX1.4 | EX1.5 |
|---|---|---|---|---|---|---|---|
| HFD PC, low Mw | % | 15 | 15 | 15 | 15 | 15 | 15 |
| HFD_PC, high Mw | % | 26.7 | 23.2 | 20.7 | 17.7 | 23.2 | 20.7 |
| 20% PC/SILOXANE COPOLYMER, PCP ENDCAPPED | % | 5 | 5 | 5 | 5 | 5 | 5 |
| THPE Branched PC Resin | % | 5 | 5 | 5 | 5 | 5 | 5 |
| PENTAERYTHRITOL TETRASTEARATE | % | 0.5 | 0.5 | 0.5 | 0.5 | 0.5 | 0.5 |
| HINDERED PHENOL ANTIOXIDANT | % | 0.1 | 0.1 | 0.1 | 0.1 | 0.1 | 0.1 |
| Irgafos 168 | % | 0.1 | 0.1 | 0.1 | 0.1 | 0.1 | 0.1 |
| PHOSPHOROUS ACID 45% | % | 0.1 | 0.1 | 0.1 | 0.1 | 0.1 | 0.1 |
| T-SAN | % | | 0.5 | 0.5 | 0.5 | 0.5 | 0.5 |
| Hayashi Kasei Talc GH7(05) | % | 20 | 20 | 20 | 20 | 20 | 20 |
| Boehmite BG-611 | % | 20 | 20 | 20 | 20 | 20 | 20 |
| Iriotec ™ 8850 from Merck | % | | 2.5 | 5 | 8 | | |
| Iriotec ™ 8825 from Merck | % | | | | | 2.5 | 5 |
| Iriotec ™ 7330 from Merck | % | | | | | | |
| VA1803 | % | 3 | 3 | 3 | 3 | 3 | 3 |
| EXL3330 | % | 2 | 2 | 2 | 2 | 2 | 2 |
| HDPE | % | 2 | 2 | 2 | 2 | 2 | 2 |
| EAAZ | | | 1 | 1 | 1 | 1 | 1 |
| SFR100 | | 0.5 | | | | | |
| % Ash | % | 36.12 | 38.54 | 41.48 | 43.55 | 37.96 | 40.5 |
| L-Avg | | 86.7 | 74 | 72.3 | 72 | 70.6 | 67.9 |
| a-Avg | | 0.6 | −3 | −3.1 | −3.2 | −2.9 | −3.5 |
| h-Avg | | 5.4 | 1 | 1.6 | 1.4 | −0.4 | −0.9 |

TABLE 2-continued

| | | | | | | | |
|---|---|---|---|---|---|---|---|
| Density-Avg | — | | 1.533 | 1.58 | 1.62 | 1.5237 | 1.5615 |
| Mw | Daltons | 57511 | 56675 | 56257 | 55405 | 56353 | 55532 |
| Mn | Daltons | 19093 | 19940 | 19967 | 19731 | 20100 | 19867 |
| HDT, 1.82 MPa, 3.2 mm | ° C. | 109 | 106 | 103 | 103 | 106 | 105 |
| Notched Izod Impact Strength | J/m | 127 | 118 | 104 | 85 | 93 | 84 |
| Unnotched Izod Impact Strength | J/m | 556 | 744 | 556 | 449 | 650 | 405 |
| MVR (300° C., 2.16 KG, 6 min) | cm$^3$/10 min | 6.74 | 4.4 | 4.8 | 6.3 | 3.7 | 3.5 |
| MVR (300° C., 2.16 KG, 18 min) | cm$^3$/10 min | 7.73 | 5.3 | 6.8 | 5.2 | 4.5 | 4.7 |
| Specific heat | J/g*K | 1.499 | 1.38 | 1.4 | 1.44 | 1.5 | 1.8 |
| Through Plane Thermal conductivity | W/(m · K) | 0.517 | 0.54 | 0.59 | 0.64 | 0.55 | 0.71 |
| Modulus of Elasticity | MPa | 2373 | 2805 | 2816 | 2822 | 2837 | 2924 |
| Stress at Break | MPa | 19.3 | 22 | 24 | 25 | 25 | 24.3 |
| Elongation at Break | % | 4.24 | 4.1 | 3 | 2.4 | 3.5 | 2.8 |
| Plating Index | | 0 | 0.7303 | 1.0491 | 0.8429 | 0.198 | 0.5467 |

| | | EX1.6 | EX1.7 | EX1.8 | EX1.9 |
|---|---|---|---|---|---|
| HFD PC, low Mw | % | 15 | 15 | 15 | 15 |
| HFD_PC, high Mw | % | 17.7 | 23.2 | 20.7 | 17.7 |
| 20% PC/SILOXANE COPOLYMER, PCP ENDCAPPED | % | 5 | 5 | 5 | 5 |
| THPE Branched PC Resin | % | 5 | 5 | 5 | 5 |
| PENTAERYTHRITOL TETRASTEARATE | % | 0.5 | 0.5 | 0.5 | 0.5 |
| HINDERED PHENOL ANTIOXIDANT | % | 0.1 | 0.1 | 0.1 | 0.1 |
| Irgafos 168 | % | 0.1 | 0.1 | 0.1 | 0.1 |
| PHOSPHOROUS ACID 45% | % | 0.1 | 0.1 | 0.1 | 0.1 |
| T-SAN | % | 0.5 | 0.5 | 0.5 | 0.5 |
| Hayashi Kasei Talc GH7(05) | % | 20 | 20 | 20 | 20 |
| Boehmite BG-611 | % | 20 | 20 | 20 | 20 |
| Iriotec ™ 8850 from Merck | % | | | | |
| Iriotec ™ 8825 from Merck | | 8 | | | |
| Iriotec ™ 7330 from Merck | | | 2.5 | 5 | 8 |
| VA1803 | % | 3 | 3 | 3 | 3 |
| EXL3330 | % | 2 | 2 | 2 | 2 |
| HDPE | % | 2 | 2 | 2 | 2 |
| EAAZ SFR100 | % | 1 | 1 | 1 | 1 |
| % Ash | % | 42.54 | 38.22 | 40 | 38.76 |
| L-Avg | — | 64.3 | 65.4 | 57.9 | 55.4 |
| a-Avg | — | −3.9 | −2.8 | −3 | −3.1 |
| h-Avg | — | −1.6 | −1 | −1.5 | −2.4 |
| Density-Avg | — | 1.6045 | 1.529 | 1.559 | 1.55 |
| Mw | Daltons | 54211 | 56536 | 54557 | 54849 |
| Mn | Daltons | 19039 | 19965 | 19155 | 19521 |
| HDT, 1.82 MPa, 3.2 mm | ° C. | 104 | 105 | 105 | 104 |
| Notched Izod Impact Strength | J/m | 66 | 104 | 76.3 | 85 |
| Unnotched Izod Impact Strength | J/m | 333 | 595 | 449 | 395 |
| MVR (300° C., 2.16 KG, 6 min) | cm$^3$/10 min | 3.3 | 3.5 | 4.1 | 5.2 |
| MVR (300° C., 2.16 KG, 18 min) | cm$^3$/10 min | 5 | 4.6 | 6 | 7.6 |
| Specific heat | J/g*K | 2.02 | 2.01 | 1.92 | 1.55 |
| Through Plane Thermal conductivity | W/(m · K) | 0.88 | 0.78 | 0.74 | 0.63 |
| Modulus of Elasticity | MPa | 2928 | 2871 | 2957 | 2856 |
| Stress at Break | MPa | 24.4 | 23 | 25.3 | 24.7 |
| Elongation at Break | % | 2.3 | 3 | 2.5 | 2.2 |
| Plating Index | | 0.5783 | 0.3485 | 0.5632 | 0.6573 |

Examples in Table 2 show the comparative results of compositions using both talc and boehmite as thermally conductive filler, VA1803/EXL3330 as the impact modifier package, and three different core-shell structure LDS additives. The shell of all three are the same with respect to the chemical component, (Sn/Sb)O₂, while the cores are different: 8850 core is TiO₂, 8825 core is mica, and 7330 core is a mixture of talc and mica.

All three structures give LDS performance in a talc/boehmite filled matrix. The 8850 additive can achieve a plating index higher than 0.7 even at 2.5 wt % loading; The 8825 additive also increases plating index, and the trend for the 7330 additive is similar.

The addition of a core-shell LDS additive to improve thermal conductivity can be seen as compared to control sample C1.1. Both the 8850 and 8825 additives enhance thermal conductivity as the loading amounts increase, whereas the 7330 additive has the opposite trend.

TABLE 3

Example 2: different LDS additive types and loading in a BN or graphite matrix

|  |  | EX 2.1 | EX 2.2 | EX 2.3 | EX2.4 | EX 2.5 | EX2.6 |
|---|---|---|---|---|---|---|---|
| HFD PC, low Mw | % | 15 | 15 | 15 | 15 | 15 | 15 |
| HFD_PC, high Mw | % | 50.7 | 40.7 | 40.7 | 40.7 | 40.7 | 40.7 |
| 20% PC/SILOXANE COPOLYMER, PCP ENDCAPPED | % |  | 5 | 5 | 5 | 5 | 5 |
| THPE Branched PC Resin | % |  | 5 | 5 | 5 | 5 | 5 |
| PENTAERYTHRITOL TETRASTEARATE | % | 0.5 | 0.5 | 0.5 | 0.5 | 0.5 | 0.5 |
| HINDERED PHENOL ANTI-OXIDANT | % | 0.1 | 0.1 | 0.1 | 0.1 | 0.1 | 0.1 |
| Irgafos 168 | % | 0.1 | 0.1 | 0.1 | 0.1 | 0.1 | 0.1 |
| PHOSPHOROUS ACID 45% | % | 0.1 | 0.1 | 0.1 | 0.1 | 0.1 | 0.1 |
| T-SAN | % | 0.5 | 0.5 | 0.5 | 0.5 | 0.5 | 0.5 |
| BNHN |  | 20 | 20 | 20 |  |  |  |
| Graphite | % |  |  |  | 20 | 20 | 20 |
| Iriotec ™ 8850 from Merck | % | 5 |  |  | 5 |  |  |
| Iriotec ™ 8825 from Merck |  |  | 5 |  |  | 5 |  |
| Iriotec ™ 7330 from Merck |  |  |  | 5 |  |  | 5 |
| VA1803 | % | 3 | 3 | 3 | 3 | 3 | 3 |
| EXL3330 | % | 2 | 2 | 2 | 2 | 2 | 2 |
| this is ACP technology based HDPE | % | 2 | 2 | 2 | 2 | 2 | 2 |
| EAAZ | % | 1 | 1 | 1 | 1 | 1 | 1 |
| % Ash | % | 25.78 | 21.77 | 23.48 | 9.27 | 7.45 | 8.62 |
| L-Avg | — | 78.2 | 82.9 | 76.8 | 41.7 | 42.4 | 41.2 |
| a-Avg | — | −2.1 | −1.6 | −1.4 | 0.1 | 0.2 | 0.4 |
| b-Avg | — | 2.1 | 2.2 | 2.3 | −1.1 | −0.9 | −0.2 |
| Density-Avg | — | 1.334 | 1.294 | 1.302 | 1.327 | 1.3225 | 1.3241 |
| Mw | Daltons | 59873 | 59426 | 59246 | 60370 | 60882 | 60023 |
| Mn | Daltons | 22044 | 21851 | 21746 | 21893 | 22156 | 21816 |
| HDT, 1.82 MPa, 3.2 mm | ° C. | 112 | 114 | 114 | 115 | 114 | 114 |
| Notched Izod Impact Strength | J/m | 101 | 171 | 134 | 136 | 117 | 123 |
| Unnotched Izod Impact Strength | J/m | 511 | 818 | 547 | 559 | 430 | 456 |
| MVR (300° C., 2.16 kg, 6 min) | cm³/10 min | 12.3 | 13.7 | 12.4 | 12.3 | 9.8 | 11 |
| MVR (300° C., 2.16 kg, 18 min) | cm³/10 min | 18.4 | 20 | 22.7 | 25.6 | 15 | 23.5 |
| Specific heat | J/g*K | 1.52 | 1.74 | 2.11 | 1.84 | 2.23 | 2.39 |
| Through Plane Thermal conductivity | W/(m · K) | 0.66 | 0.63 | 0.79 | 0.78 | 0.89 | 0.97 |
| Modulus of Elasticity | MPa | 4397 | 3559 | 5456 | 3502 | 5731 | 3473 |
| Stress at Break | MPa | 35 | 28.5 | 50 | 35 | 52.5 | 34.3 |
| Elongation at Break | % | 4.3 | 4.7 | 2.6 | 3.7 | 2.3 | 3.7 |
| PI |  | 1.0438 | 0.6267 | 0.6916 | 0.5616 | 0.3322 | 0.3093 |

Examples in Table 3 show the comparative results of compositions using boron nitride or graphite as the thermal conductive filler, VA1803/EXL3330 as the impact modifier package, and one of three core-shell structure LDS additives at a fixed loading of 5 wt %. The plating index contribution from the core-shell structure LDS additive from highest to lowest is 8850, 8825, 7330, and it is the same trend in talc/boehmite, BN, or a graphite filled matrix. Compositions with graphite had a lower plating index than boron nitride with the same core-shell structure LDS additive type and loading.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A thermally conductive polymer composition comprising:
   a. from about 20 wt % to about 80 wt % of at least one polymer component, wherein the polymer component comprises a polycarbonate;
   b. from greater than about 0 wt % to about 70 wt % of a thermally conductive filler; and
   c. from about 0.1 wt % to about 40 wt % of a laser activatable additive having a core-shell structure; wherein the core comprises an inorganic filler and the shell comprises a laser activatable component,
   wherein the combined weight percent value of all components does not exceed 100 wt %,
   wherein all weight percent values are based on the total weight of the composition,
   wherein a molded sample of the composition has a through plane thermal conductivity of at least about 0.40 W/m·K when determined in accordance with ASTM E1461, and wherein a molded sample of the composition exhibits a notched Izod impact strength of at least 66 J/m when tested in accordance with ASTM D256 at 23° C.

2. The composition of claim 1, wherein the thermally conductive filler comprises: a high thermally conductive filler having a thermal conductivity greater than or equal to about 50 W/m·K; or a low thermally conductive filler having a thermal conductivity from about 10 W/m·K to about 30 W/m·K; or a combination thereof.

3. The composition of claim 2, wherein the high thermally conductive filler is selected from the group consisting of aluminum nitride AlN, aluminum carbide $Al_4C_3$, aluminum oxide $Al_2O_3$, boron nitride BN, aluminum oxynitrides AlON, magnesium silicon nitride $MgSiN_2$, silicon carbide SiC, silicon nitride $Si_3N_4$, graphite, expanded graphite, graphene, carbon fiber, and combinations thereof.

4. The composition of claim 2, wherein the low thermally conductive filler is selected from the group consisting of $Mg(OH)_2$ (Magnesium hydroxide), steatite $H_2Mg_3(SiO_3)_4$ (Talc), γ-AlO(OH) (boehmite),α-AlO(OH) (diaspore), $Al(OH)_3$ (gibbsite), $CaCO_3$, mica, barium oxide BaO, barium sulfate $BaSO_4$, wollastonite $CaSiO_3$, zirconium oxide $ZrO_2$, silicon oxide $SiO_2$, glass beads, magnesium aluminate $MgO.xAl_2O_3$, dolomite $CaMg(CO_3)_2$, ceramic-coated graphite, clay, and combinations thereof.

5. The composition of claim 1, wherein the shell is a metal, metal oxide, or mixed-metal oxide.

6. The composition of claim 1, wherein the core is a metal oxide, mica, talc, aluminum nitride AlN, $Al_4C_3$, BN, $MgSiN_2$, SiC, $Si_3N_4$, graphite, expanded graphite, graphene, carbon fiber, ZnS, glass beads, clay, or a combination thereof.

7. The composition of claim 1, wherein the shell component has a thickness of from about 1 nm to about 50 μm.

8. The composition of claim 1, wherein the core has a mean particle size of about 50 nm to about 500 μm.

9. The composition of claim 1, wherein the core component is about 2% to about 70% by weight, with the balance of the laser activatable additive being the shell.

10. The composition of claim 1, further comprising glass fiber.

11. The composition of claim 1, further comprising an organic or inorganic flame retardant.

12. The composition of claim 1, the polymer component further comprising a chemical reactive or non-chemical reactive impact modifier.

13. The composition of claim 1, further comprising an additive comprising an antioxidant, a lubricant, a thermal stabilizer, an ultraviolet light absorbing additive, a plasticizer, an anti-dripping agent, a mold release agent, an antistatic agent, a dye, a pigment, or a radiation stabilizer, or a combination thereof.

14. The composition of claim 1, wherein a molded sample of the composition exhibits a plating index value of at least about 0.6.

15. An article comprising a composition of claim 1.

16. The article of claim 15, wherein the article is selected from a computer device, electromagnetic interference device, printed circuit, global positioning system device, cellular antenna device, smart phone device, automotive device, medical device, sensor device, security device, shielding device, shadowless lamp, radiofrequency antenna device, light emitting diode device and radio frequency identification device.

17. A method of manufacturing an article comprising:
   a. molding an article from the composition of claim 1;
   b. exposing the laser activatable additive to a laser to form an activated area; and
   c. plating a metal layer onto the activated area.

18. The thermally conductive polymer composition of claim 1, comprising:
   a. from about 50 wt % to about 70 wt % of the polymer component;
   b. from about 10 wt % to about 20 wt % of the thermally conductive filler; and
   c. from about 2 wt % to about 10 wt % of the laser activatable additive.

19. The composition of claim 1, wherein the core is mica, talc, aluminum nitride AlN, $Al_4C_3$, $Al_2O_3$, BN, AlON, $MgSiN_2$, SiC, $Si_3N_4$, graphite, expanded graphite, graphene, carbon fiber, ZnS, CaO, MgO, ZnO, $TiO_2$, $Mg(OH)_2$,γ-AlO(OH) (boehmite), α-AlO(OH) (diaspore), $Al(OH)_3$ (gibbsite), $CaCO_3$, BaO, $BaSO_4$, $CaSiO_3$, $ZrO_2$, $SiO_2$, glass beads, $MgO.xAl_2O_3$, $CaMg(CO_3)_2$, clay, or a combination thereof.

* * * * *